Figure 1:
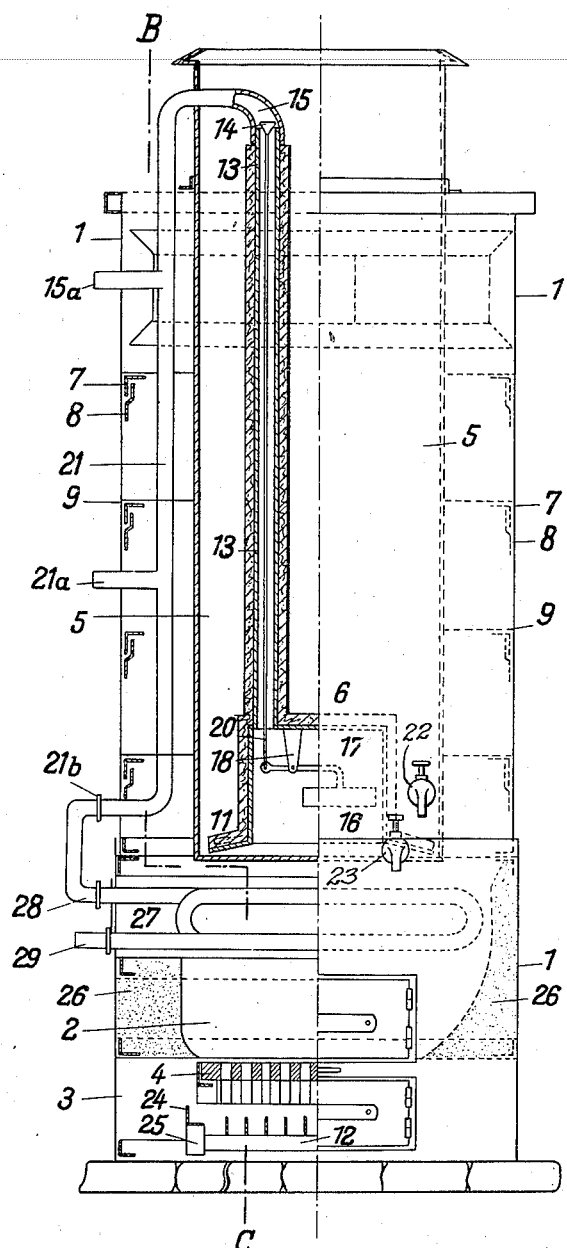

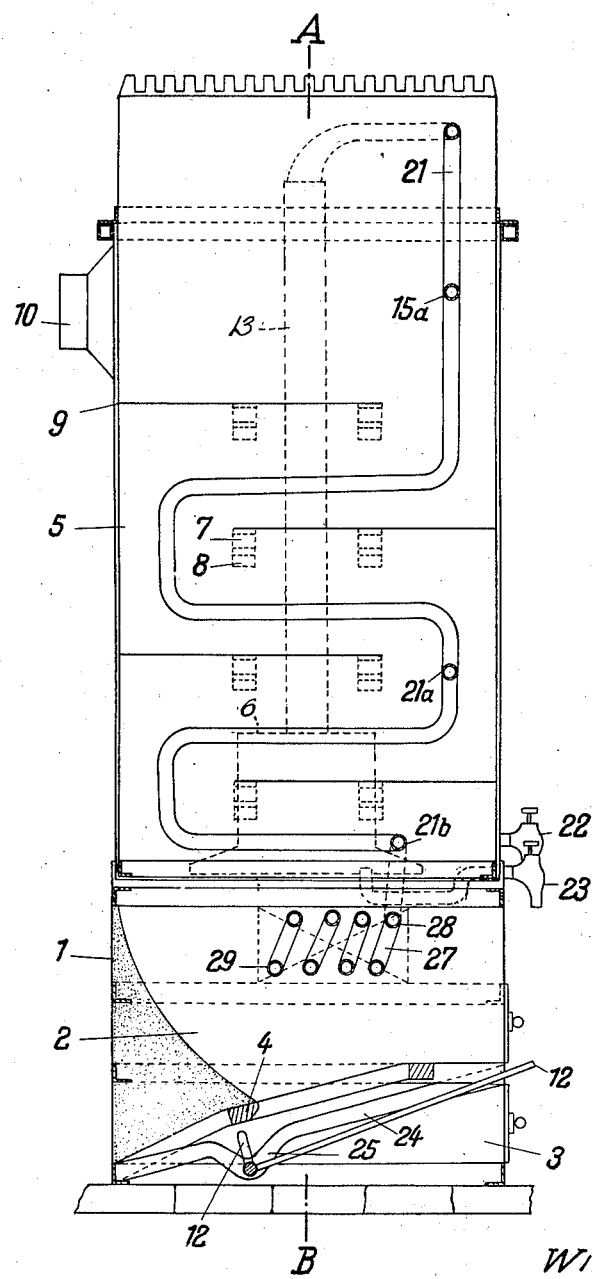

Patented Apr. 11, 1939

2,153,717

UNITED STATES PATENT OFFICE 2,153,717

COMBINED HOT-WATER AND STEAM GENERATING DEVICE

Wilhelm Kiss, Aszod, Hungary

Application January 25, 1937, Serial No. 122,301
In Hungary January 24, 1936

8 Claims. (Cl. 122—37)

(Granted under the provisions of sec. 14, act of March 2, 1927; 357 O. G. 5)

In the known hot-water and steam boilers the whole quantity of water contained in the boiler is simultaneously and approximately uniformly heated due to the continuous exchange or circulation occurring between the water near the heated wall or walls of the boiler and the upper layers of water which are not heated and therefore have a lower temperature so that the resulting temperature of the total quantity of water in the boiler is approximately uniform. Therefore, if hot water and steam are to be produced in the boiler at the same time, the whole quantity of water in the boiler has to be heated to the boiling point. This, of course, takes much time and requires much fuel.

It is an object of my invention to provide a boiler which is capable of producing hot water and steam simultaneously with a better efficiency as regards heating time and fuel consumption. Other objects of the invention will be apparent from the following description of my invention.

According to my invention the water vessel of the boiler is divided into two compartments of different size which communicate with, and are heat-insulated from, one another by one or more heat-insulated walls. The smaller compartment is located below the larger one and adjacent to the combustion chamber. Now, the circulation of the water effected by the lower specific weight of the heated water will occur only in the lower and smaller vessel and consequently the temperature in this smaller vessel will be always substantially higher than that in the larger vessel and the production of steam will be started much earlier than in case of uniform heating of the total amount of water being in the two compartments.

The lower and smaller vessel which is in direct contact with the combustion chamber or forms one wall thereof is advantageously formed by a bell-shaped body mounted on the bottom of the larger vessel and provided with a heat-insulating double wall, in such manner that the side walls of the "bell" form an angle of 8-10° with the bottom of the larger vessel.

For a complete understanding of the invention, the following description should be read in connection with the accompanying drawings showing by way of example one embodiment of the invention, viz.

Fig. 1 is a view of the boiler partly in section;
Fig. 2 is a section according to the line B—C in Fig. 1.

In the drawings, the lower part of the bipartite mantle 1 encloses the combustion chamber 2, the ash pit or pan 3, the grate 4 and the grate poking device 12. The upper part of the mantle comprises the water vessel 5, which communicates with the atmosphere, the waste gas guiding plates or sheets 9 and the superheater 21. The L-irons 7 are suspended in their middle part to the hooks 8; the edges of the plates 9 engage or contact the wall of the water vessel 5 and prevent it from bulging. A stove-pipe or waste gas pipe 10 is mounted at the upper part of the mantle 1.

A bell 6 of a suitable weight provided with a heat-insulated double wall or consisting of heat-insulating material is loosely placed or mounted on the bottom of the water vessel 5. The lower or mouth part 11 of the side walls of the bell 6 forms an angle of approximately 8-10° with the bottom of the vessel 5. Mounted on the bell 6 is a tube 13 which is also provided with a heat-insulating double wall or consists of heat-insulating material, for connection of the bell 6 with the superheater 21. A valve casing 15 with a valve 14 is provided at the upper end of this tube 13; the shaft 20 of the valve is connected with the float 16 in the bell 6 by means of a two-armed lever 17 pivoted at 18.

The superheater 21 has two outlets 15a and 21a from which steam of about 100° C. can be drawn. Connected at 28 to the waste gas-heated superheater 21 is a further superheater 27 which is situated directly in the combustion chamber and from the outlet 29 of which steam of about 600° C. can be drawn. The vessel 5 is provided with a tap 22 for drawing hot water; another tap 23 is connected to the bottom portion of the vessel 5 which is covered by the bell 6, by means of a tube going through the combustion chamber, this tap serving for tapping boiling water. The grate cleaning or poking device 12 rests in a recess 25 of the rails 24 and can be moved along these rails in order to clean or poke up the grate.

The working principle of the boiler unit shown in the drawings is as follows:

As the bell 6 is loosely placed on the bottom of the vessel 5, the water inside the bell can communicate with the water outside the bell through the narrow space at the mouth of the bell afforded by the loosely mounting of said bell on said bottom. The water forced through the narrow space from the large vessel into the bell under action of the pressure of the high water column in the large vessel will be evaporated and the resulting steam bubbles produce a kind of valve effect in the narrow passage of the bell which gradually widens or extends towards the center so that the pressure in the bell may rise by some tenths of a kilogram per square centimeter without interfering with the flow of the water from the large into the small compartment or vessel. The steam generated in the bell 6 can be discharged through the valve 14 which is automatically controlled by the float 16 in dependence on the water level in the bell 6 and gets to the tubes 21 and 27 which are heated by the combustion gases and from which it can be tapped at different points with a different temperature. If the steam is not drawn off, it streams from the bell 6 into the vessel 5 and condenses into the water contained therein with a corresponding heating effect.

It will be understood that the operation of the boiler is very simple and can be carried out by any unskilled person. When filling the vessel 5 with water the bell 6 is also filled with water automatically, the valve 14 being closed by the float 16 when a predetermined level is reached in the bell. The filling of the bell goes on until the pressure of the air enclosed in the upper part of the bell is equal to the pressure of the water column in the boiler 5. Now the water in the bell 6 is heated to the boiling point in a very short time under direct action of the heat in the adjacent combustion chamber, the heat-insulated walls of the bell preventing the heat from being imparted to the water contained in the vessel 5. As soon as the pressure of the steam produced in the bell 6 reduces the water level in the bell below a predetermined value, the valve 14 is opened by the float 16 and the steam escapes into the superheater 21 in which it is superheated by the combustion gas surrounding the superheater to about 300° C. when reaching the outlet 21a.

If the steam is not drawn off at the tap 15a nor at the tap 21a, it streams into the additional superheater 27 in which it is heated to about 600° C. If no steam is used, the steam is led back into the vessel 5 for condensation.

My new device offers the advantage that small quantities of hot water and steam are available already a few minutes after starting the fire, i. e. saturated steam of about 100° C. or alternatively superheated steam of a temperature of up to 600° C. Therefore the device is very suitable both as a steam shower and for disinfecting clothing, laundry, and the like. A particular advantage of my new device resides in the fact that it is also possible to disinfect clothing which so far had to be disinfected by chemical methods, such as high-quality suits, hats, furs, and the like, as the absolutely dry steam of about 600° C. available in this case kills the vermin and microbes in a few minutes without shrinking of the fabric or hardening of leather. Another important advantage of the device consists in that it has no closed steam vessel so that it is explosion-proof and fool-proof in operation and not subjected to any official supervision or tests. Also no difficulties will arise due to fur as the fur deposited on the bottom of the large vessel can be easily scraped off after the bell has been removed, while the fur deposited on the bell is even useful as it augments the heat-insulation between the bell and the water in the vessel 5. Apart from the hot water and steam supply obtained from the bell the hot water contained in the large container 5 is sufficient for filling a bath tub 3 to 5 times depending on the size of the vessel 5. On the other hand the cost for manufacturing and operating my device is very small.

While I have herein shown and described certain preferred embodiments of my invention, I wish it to be understood that I do not confine myself to all the precise details herein set forth by way of illustration, as modification and variation may be made without departing from the spirit of the invention or exceeding the scope of the appended claims.

I claim:

1. In a combined hot-water and steam generating device, in combination, a combustion chamber, a smoke flue, a water vessel comprising a small water compartment adjacent to and subject to the heat of said combustion chamber, and a large water compartment above the said small compartment and adjacent to and subject to the heat of said smoke flue, said small water compartment being submerged in said large compartment, said large compartment being arranged to communicate constantly both with the atmosphere and with the lower part of said small compartment, heat-insulating means between said compartments, a steam outlet pipe connected to said small compartment, and a water outlet conduit connected to said large compartment.

2. In a combined hot-water and steam generating device, in combination, a combustion chamber, a smoke flue, and a water vessel comprising a small water compartment adjacent said combustion chamber consisting of a bell-shaped heat insulating wall loosely resting on the bottom of said water vessel and a larger water compartment above and separated by said wall from said small compartment and adjacent said smoke flue, said larger compartment constantly communicating both with the atmosphere and with the lower part of said small compartment, a steam outlet pipe connected to said small compartment, and a water outlet conduit connected to said large compartment.

3. In a combined hot-water and steam generating device, in combination, a combustion chamber, a smoke flue, and a water vessel comprising a small water compartment adjacent said combustion chamber consisting of a bell-shaped heat insulating wall loosely resting on the bottom of said water vessel and forming an angle ranging between 8–10° between its lower edge and said bottom and a larger water compartment above and separated by said wall from said small compartment and adjacent said smoke flue, said larger compartment constantly communicating with the atmosphere and with the lower part of said small compartment, a steam outlet pipe connected to said small compartment, and a water outlet conduit connected to said large compartment.

4. In a combined hot-water and steam generating device, in combination, a combustion chamber, a smoke flue, a water-vessel comprising a small water compartment adjacent to and subject to the heat of said combustion chamber, and a large water compartment above said small compartment and adjacent to and subject to the heat of said smoke flue, said small water compartment being submerged in said large compartment said large compartment being arranged to communicate constantly both with the atmosphere and with the lower part of the said small compartment, heat insulating means between said compartments, a steam outlet pipe connected to said small compartment, a water outlet conduit connected to said large compartment, and means for automatically shutting off the connection between said steam outlet pipe and said small compartment in response to a predetermined low water level in said small compartment.

5. In a combined hot-water and steam generating device, in combination, a combustion chamber, a smoke flue, and a water vessel comprising a small water compartment adjacent said combustion chamber consisting of a bell-shaped heat insulating wall loosely resting on the bottom of said water vessel and forming an angle ranging between 8-10° between its lower edge and said bottom and a larger water compartment above and separated by said wall from said small compartment and adjacent said smoke flue, said larger compartment constantly communicating both with the atmosphere and with the lower part of said small compartment, a steam outlet pipe connected to said small compartment, and a water outlet conduit connected to said large compartment, a float in said small compartment, a valve in said steam outlet pipe, and means for controlling said valve by said float to close said valve at a predetermined minimum water level in said small compartment.

6. In a combined hot-water and steam generating device, in combination, a combustion chamber, a smoke flue, a water-vessel comprising a small water compartment adjacent to and subject to the heat of said combustion chamber, and a large water compartment above said small compartment and adjacent to and subject to the heat of said smoke flue, said small water compartment being submerged in said large compartment, said large compartment being arranged to communicate constantly both with the atmosphere and with the lower part of said small compartment, heat insulating means between said compartments, a steam outlet pipe connected to said small compartment, a water outlet conduit connected to said large compartment, and a steam superheater connected to said steam outlet pipe and arranged in the path of waste gases passing from said combustion chamber.

7. In a combined hot-water and steam generating device, in combination, a combustion chamber, a smoke flue, a water vessel comprising a small water compartment adjacent to and subject to the heat of said combustion chamber, and a large water compartment above said small compartment and adjacent to and subject to the heat of said smoke flue, said small water compartment being submerged in said large compartment, said large compartment being arranged to communicate constantly both with the atmosphere and with the lower part of the said smaller compartment, heat-insulating means between said compartments, a steam outlet pipe connected to said small compartment, a water outlet conduit connected to said large compartment, a steam superheater connected to said steam outlet pipe and arranged in the path of waste gases passing from said combustion chamber, and another steam superheater connected in series with the said first steam superheater and located in said combustion chamber to receive direct heating from the flames therein.

8. In a combined hot-water and steam generating device, in combination, a combustion chamber, a smoke flue, a water-vessel comprising a small water compartment adjacent to and subject to the heat of said combustion chamber, and a large water compartment above said small compartment and adjacent to and subject to the heat of said smoke flue, said small water compartment being submerged in said large compartment, said large compartment being arranged to communicate constantly both with the atmosphere and with the lower part of the said small compartment, heat insulating means between said compartments, a steam outlet pipe connected to said small compartment, a water outlet conduit connected to said large compartment, a steam superheater connected to said steam outlet pipe and arranged in the path of waste gases passing from said combustion chamber, and another steam superheater connected in series with said first steam superheater and located in the combustion chamber to receive direct heating from the flames therein, said superheaters having a plurality of steam tapping points distributed over their entire lengths.

WILHELM KISS.